(12) United States Patent
K Sebastian et al.

(10) Patent No.: US 10,992,528 B2
(45) Date of Patent: Apr. 27, 2021

(54) CONFIGURING NETWORK DEVICES

(71) Applicant: HEWLETT PACKARD ENTERPRISE DEVELOPMENT LP, Houston, TX (US)

(72) Inventors: Celestian K Sebastian, Bangalore (IN); Vijeesh E P, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 378 days.

(21) Appl. No.: 15/508,492

(22) PCT Filed: Apr. 22, 2015

(86) PCT No.: PCT/US2015/027051
§ 371 (c)(1),
(2) Date: Mar. 3, 2017

(87) PCT Pub. No.: WO2016/171682
PCT Pub. Date: Oct. 27, 2016

(65) Prior Publication Data
US 2017/0279680 A1    Sep. 28, 2017

(51) Int. Cl.
*H04L 12/24* (2006.01)
*G06F 11/00* (2006.01)
(Continued)

(52) U.S. Cl.
CPC ......... *H04L 41/0816* (2013.01); *G06F 11/00* (2013.01); *H04L 41/04* (2013.01);
(Continued)

(58) Field of Classification Search
CPC . H04L 41/0816; H04L 41/0654; H04L 41/04; H04L 43/0811; H04L 61/2007;
(Continued)

(56) References Cited

U.S. PATENT DOCUMENTS 6,938,089 B1 * 8/2005 Slaby .................. H04L 41/0806
709/203
8,402,120 B1    3/2013 Perkinson
(Continued)

FOREIGN PATENT DOCUMENTS

KR    1020120107047 A    9/2012

OTHER PUBLICATIONS

International Search Report and Written Opinion, International Application No. PCT/US2015/027051, dated Jan. 19, 2016, pp. 1-10, KIPO.

(Continued)

*Primary Examiner* — Jason D Recek
(74) *Attorney, Agent, or Firm* — Hewlett Packard Enterprise Patent Department

(57) ABSTRACT

Example implementations relate to configuring network devices. For example, a network device includes a controller module to receive a link layer discovery protocol (LLDP) message from a second network device in response to determining that connection to a management device has failed. The controller module is to send a second LLDP message to the second device, where information contained is the second LLDP message is routed to the management device by the second device. The controller module is further to receive configuration changes from the management device and connect to the management device based on the configuration changes, where the configuration changes are routed by the second device.

20 Claims, 4 Drawing Sheets

(51) Int. Cl.
  *H04L 12/751* (2013.01)
  *H04L 12/721* (2013.01)
  *H04L 12/26* (2006.01)
  *H04L 29/12* (2006.01)
  *H04L 29/14* (2006.01)

(52) U.S. Cl.
  CPC ...... *H04L 41/0654* (2013.01); *H04L 43/0811* (2013.01); *H04L 45/02* (2013.01); *H04L 45/66* (2013.01); *H04L 61/2007* (2013.01); *H04L 69/40* (2013.01); *Y02D 30/00* (2018.01)

(58) Field of Classification Search
  CPC ......... H04L 69/40; H04L 45/00; H04L 45/02; H04L 45/66; G06F 11/00; Y02D 30/00
  See application file for complete search history.

(56) References Cited

U.S. PATENT DOCUMENTS

| | | | |
|---|---|---|---|
| 2006/0000910 A1* | 1/2006 | Chong | H04W 28/18 235/462.15 |
| 2008/0313235 A1* | 12/2008 | Matsubara | G06Q 10/10 |
| 2010/0110918 A1* | 5/2010 | Mihaly | H04L 43/00 370/252 |
| 2010/0332873 A1* | 12/2010 | Munjal | G06F 1/3203 713/320 |
| 2011/0035474 A1* | 2/2011 | Elzur | H04L 41/0816 709/221 |
| 2011/0040829 A1* | 2/2011 | Lee | H04L 67/10 709/203 |
| 2011/0289150 A1* | 11/2011 | Westaway | G06Q 10/107 709/205 |
| 2011/0289198 A1 | 11/2011 | Isaacson et al. | |
| 2012/0147894 A1 | 6/2012 | Mulligan et al. | |
| 2013/0086236 A1 | 4/2013 | Baucke et al. | |
| 2013/0158729 A1 | 6/2013 | Ghose et al. | |
| 2013/0176896 A1 | 7/2013 | Shukla | |
| 2013/0179549 A1 | 7/2013 | Lin et al. | |
| 2013/0182712 A1 | 7/2013 | Aguayo et al. | |
| 2015/0019659 A1* | 1/2015 | Eidelson | H04L 51/32 709/206 |
| 2015/0026313 A1 | 1/2015 | Chawla et al. | |
| 2016/0037436 A1* | 2/2016 | Spencer | H04W 48/12 370/338 |
| 2016/0149716 A1* | 5/2016 | Raj | H04L 12/2832 700/275 |

OTHER PUBLICATIONS

Yuefeng Wang and Ibrahim Matta, "SDN Management Layer: Design Requirements and Future Direction," Aug. 19, 2014, pp. 1-8, Technical Report BUCS-TR-2014-006, Boston University, Available at: <csr.bu.edu/rina/papers/BUCS-TR-2014-006.pdf>.

* cited by examiner

CONFIGURING NETWORK DEVICES

BACKGROUND

Network management such as cloud network management often involves administrators that configure network devices (e.g., switches, access points, etc.) located remotely from the administrator or network manager (i.e., off-premise). Such administrators may need to manage and configure the devices often either when the devices are initially deployed or after deployment, by connecting to the devices.

BRIEF DESCRIPTION OF THE DRAWINGS

Some examples of the present application are described with respect to the following figures.

DETAILED DESCRIPTION

Figure 1:
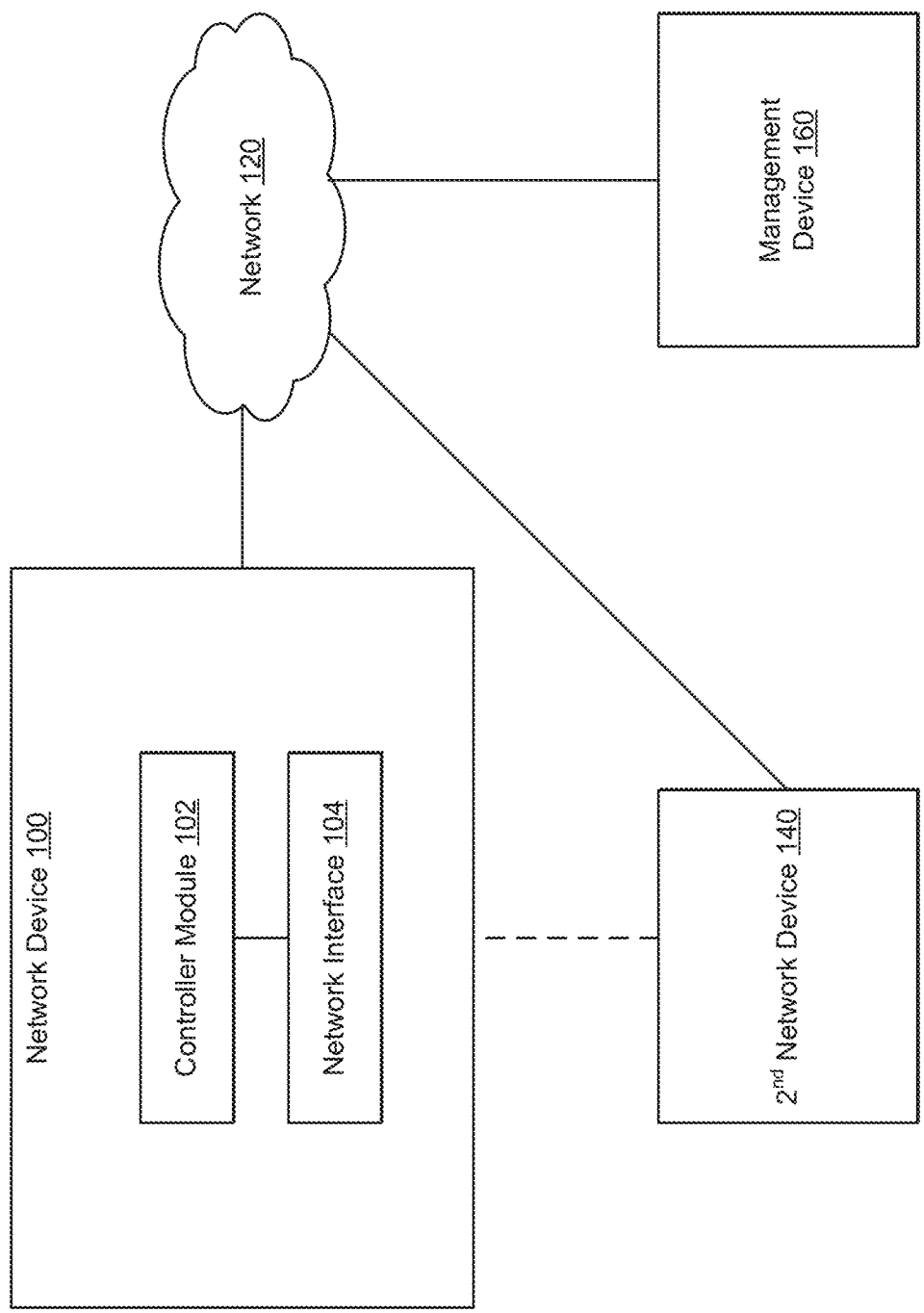
FIG. 1 is a block diagram of an example network device configurable by a management device.

In a network based management environment, such as a cloud based network management environment, configuration of end devices (e.g., switches, routers, access points, etc.) are pushed by the management device (e.g., a cloud network manager (CNM)) to the end devices. It is important to manage the network connectivity of end devices to the management device to ensure that the end devices are properly configured. Initial configuration (e.g., certificates and other security related configurations, network configuration, etc.) may be done prior shipping so that the device can connect to the CNM once unpacked and connected to a network (e.g., a wide area network (WAN)). However, any changes in the connection or configuration may lead to an unintentional loss of connection to the CNM. For example, the device may download and apply a configuration that causes it to lose connection to the CNM. When the network connectivity between the CNM and the device is lost, the CNM may be unable to manage the device due to loss of communication, and may require physical intervention at the end device to re-establish connectivity.

Examples disclosed herein address the above needs and challenges by providing a solution for configuring a network device through a neighboring device that has an active connection to a management device. The management device can reach a device that has lost connection to the management device and restore connection, through a neighboring device in the network that has an active connection (e.g., a wired connection) to the "faulty" device and to the management device. Configuration changes for restoring or establishing connection with the management device can be routed via the neighboring device.

Accordingly, the described examples can significantly reduce the downtime of network devices due to faulty or lost connections to the management device. Further, the described examples provide a zero-touch configuration solution for unreachable devices by using neighboring devices to provide correct configurations, thereby significantly reducing the need for human (e.g., administrator) intervention. Moreover, because no internet protocol (IP) address is reserved for reaching a faulty device, there is no change required in the network. The described examples are applicable to faulty connections due to initial (e.g., factory based) configurations as well as faults due to incorrect configurations during operation of the devices.

In one example, a network device includes a controller module to receive a link layer discovery protocol (LLDP) message from a second network device in response to determining that connection to a management device has failed. The controller module is to send a second LLDP message to the second device, where information contained is the second LLDP message is routed to the management device by the second device. The controller module is further to receive configuration changes from the management device and connect to the management device based on the configuration changes, where the configuration changes are routed by the second device.

In another example, a method includes determining, by a network device, that connection to a management device has failed after a predetermined number of unsuccessful and listening for a link layer discovery protocol (LLDP) message from a plurality of neighboring network devices communicatively coupled to the device and to the management device. The method includes sending a second LLDP message to a neighboring device of the plurality of neighboring devices, where information contained in the second LLDP message is routed to the management device by the neighboring device. The method also includes receiving configuration changes from the management device, where the configuration changes are routed via the neighboring device, and implementing the configuration changes at the device and establishing connection with the management device.

In another example, a non-transitory computer-readable storage medium is encoded with instructions executable by a processor of a network device to listen for and receive a link layer discovery protocol (LLDP) message from a second device, in response to determining that connection with the management device is unsuccessful after a predetermined number of attempts. The instructions are executable to send a second LLDP message to the second device, where data contained in the second LLDP message is routed to the management device by the second device and where the data indicates that the device is unable to connect to the management device. The instructions are also executable to receive a configuration packet from the management device via the second device and to restore connection to the management device based on the configuration packet.

Referring now to the figures, FIG. 1 is a block diagram of an example network device configurable by a management device. Network device 100 can be any computing device that can be used in a network 120. For example, device 100 can be a switch, a router, a hub, a repeater, a bridge, an access point, or any other electronic network device. Device 100 can communicate with other computing devices over the network 120. For example, device 100 can communicate with a second network device 140 and a management device 160. Further, device 100 can be managed by a network manager/application or an Internet of Things (IoT) device managed by a management device/application. Device 100 can include a controller module 102 and a network interface 104. Second device 140 can include similar, more, or less components as device 100.

Controller module 102 may include one or more central processing units (CPUs) or cores thereof, microprocessors, hardware state machines, graphic processing units (GPUs), field-programmable gate arrays (FGPAs), or other electronic circuitry, which may be integrated in a single device or distributed across devices. In some examples, controller module 102 may include one or more "lights-out" modules that may be powered on and operational when other modules or components of device 100 are not powered on or are not operational. Controller module 102 can be responsible for performing the functionalities of device 100, including enabling management and configuration by management device 160.

Network interface 104 can include a number of electronic components for communicating with other devices. For example, network interface 104 can be a wireless interface such as a wireless local area network (WLAN) interface and/or a physical interface such as an Ethernet interface, universal serial bus (USB) interface, extended serial advanced technology attachment (eSATA) interface, or any other physical connection interface suitable for communicating with other devices. In operation, as detailed below network interface 104 can receive and send communication data through a wireless medium (e.g., WLAN, Internet) and/or through a physical medium (e.g., copper cable, optical fiber, air, etc.), and send the data to the controller module 102.

Network 120 can be any combination of local area networks, wide area networks, the Internet, wired, or wireless networks, or other types of networks. In some examples, network 120 can be a cloud network such as a public cloud network, a private cloud network, a hybrid cloud network, other forms of cloud networks, or combinations thereof. In such examples, device 100 can be a cloud-managed device that is managed by a cloud network manager (e.g., management device 160).

Management device 160 can be any computing device for managing a plurality of network devices including device 100 and second device 140. Management device 160 can be an off-premise device (i.e., remotely located from devices 100 and 140). In some examples, management device 160 can be a network manager such as a cloud network manager (CNM) for managing the plurality of devices. In other examples, management device 160 can be a server device for managing a plurality of client devices (e.g., device 100 and second device 140).

During operation, the controller module 102 may determine that the device 100 is unable to establish a connection to the management device 160, after a predetermined number of unsuccessful attempts. For example, connection to the management device 160 may fail due to a faulty initial configuration settings of the device 100, corrupted configuration during operation of the device 100, misconfiguration at the device 100, or any other changes in the settings/configuration of the device 100. In certain examples, controller module 102 can make the determination that connection is unsuccessful after a predetermined number of attempts to connect with the management device 160. In other examples, controller module 102 can make the determination after a predetermined time period (e.g., a few seconds) of unsuccessful attempts.

In response to determining that connection to the management device 160 has failed, controller module 102 may begin to listen for and receive a link layer discovery protocol (LLDP) message from a second network device 140 (e.g., a neighboring device) that has an active connection to the management device 160 (e.g., via the network 120). In addition, second device 140 is communicatively coupled to the device 100 (e.g., via a wired connection, as shown by the dotted lines). As used herein "LLDP" is a link layer protocol in the Internet protocol suite used by network devices to advertise their identity, capabilities, and neighbors on an institute of electrical and electronics engineers (IEEE) 802 local area network, principally wired Ethernet. Device discovery protocols such as the LLDP enable directly connected devices to discover information about each other.

Based on the LLDP message, and in some examples, along with a port in which the LLDP message was received, the controller module 102 can determine the internet protocol (IP) address of the second device 140 (e.g., extracted from management type length value (TLV) of the LLDP message). Using the IP address of the second device 140, controller module 102 can configure the device 100 to communicate with the second device 140 (e.g., configure a virtual local area network (VLAN) of the device 100 with an unused IP address to communicate with the IP address of the second device 140).

Upon configuring device 100 to communicate with the second device 140, controller module 102 can generate and send an LLPD message to the second device 140 to advertise its presence. On receiving the LLDP message from device 100, second device 140 can route information contained in the LLDP message to the management device 160. For example, second device 140 can encapsulate the LLDP message and route the encapsulated message to the management device 160. Management device 160 is able to determine that the device 100 has lost connection or cannot establish connection based on the information contained in the LLDP message from the device 100. For example, management device 160 is able to determine the topology of the network and neighboring devices through which it can reach (or route messages to) device 100.

Management device 160 can route configuration changes to the device 100 via the second device 140. Upon receipt of the configuration changes, controller module 102 is able to implement/execute the configuration changes to establish or restore connection with the management device 160. In some examples, the configuration changes routed to the device 100 via the second device 140 include minimum configuration changes to establish the connection. In such examples, once connection is established with the management device 160, device 100 can receive data packets to execute security and verification processes (e.g., security keys/token exchange, certificate validation, etc.) to determine that the device 100 is a valid device, prior to receiving full configuration data. In other examples, device 100 can receive a notification message from the management device 160, via the second device 140, prior to receiving the configuration changes. In such examples, the notification message indicates an intent by the management device 160 to reconfigure the device 100. The device 100 acknowledges the notification prior to receiving the configuration changes.

Accordingly, the described examples can significantly reduce downtime of network devices due to failed connection to a management device. Further, the described solution is efficient because it negates the need for a fixed IP address at a faulty device for troubleshooting failed network connections. Moreover, there is no need to alter any existing connectivity/configuration because a faulty device is able to self-assign an unused IP address to connect to a neighboring device having an active connection to a management device. Further, the described solution enables devices to connect to a different management device, a customer deployed management device, instead of a default management device, without administrator intervention.

Figure 2:
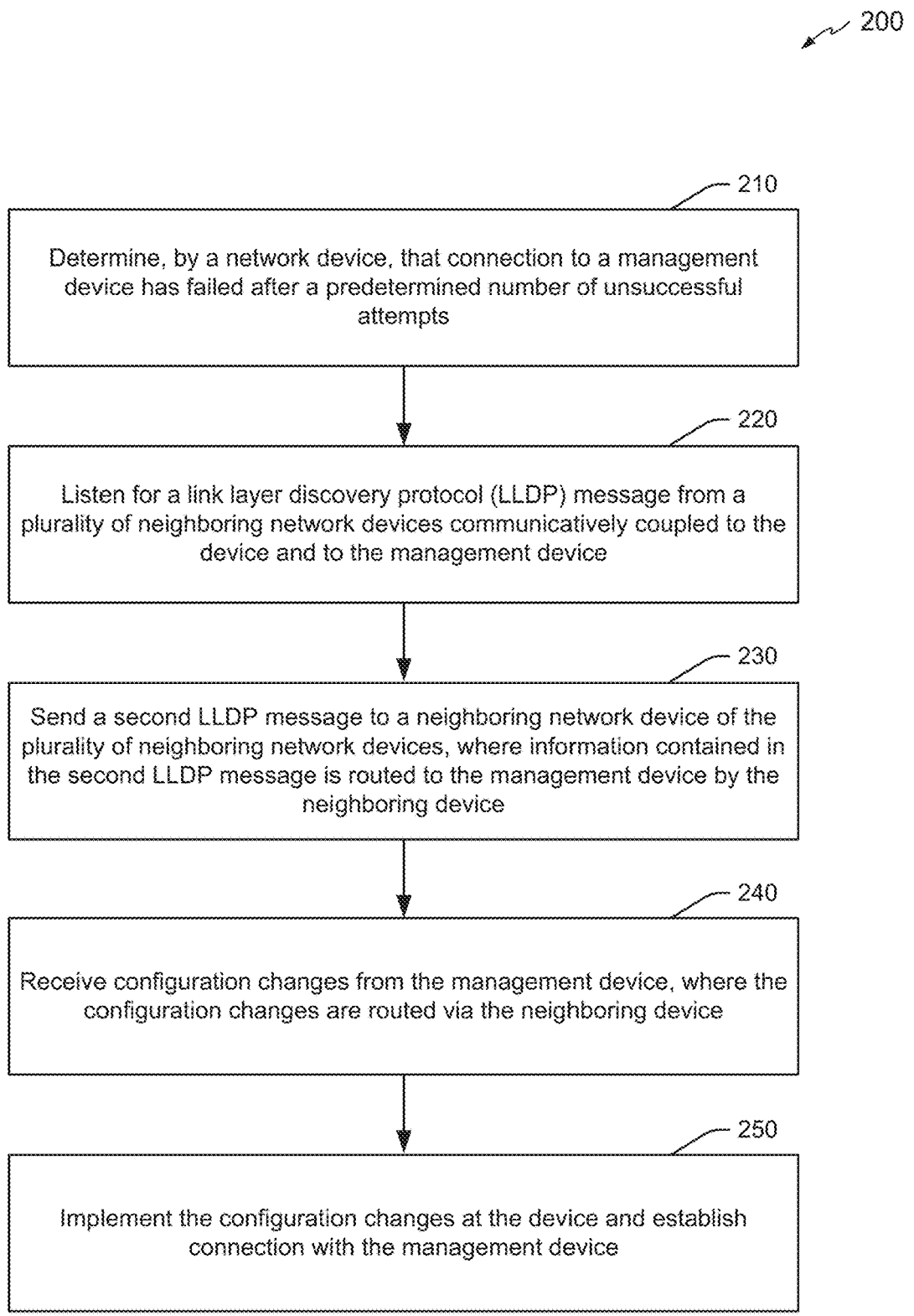
FIG. 2 is a flowchart of an example method for configuring network devices.

FIG. 2 is a flowchart of an example method for configuring network devices. Although execution of method 200 is described below with reference to device 100 of FIG. 1, other suitable devices for execution of method 200 may be used. Method 200 can be implemented in the form of executable instructions stored on a computer-readable storage medium, such as computer-readable storage medium 420 of FIG. 4, and/or in the form of electronic circuitry.

Method 200 includes determining, by a network device, that connection to a management device has failed after a predetermined number of unsuccessful attempts, at 210. For example, controller module 102 of device 100 can determine that device 100 is unable to connect to management device, after "n" number of attempts (where "n" is an integer greater than 1), or after a predetermined time period of unsuccessful attempts (e.g., a few microseconds, milliseconds, seconds, etc.).

Method 200 includes listening for a link layer discovery protocol (LLDP) message from a plurality of neighboring network devices communicatively coupled to the device and to the management device, at 220. For example, controller module 102 can begin to listen for LLDP messages transmitted by a plurality of neighboring network devices such as second device 140. Second device 140 can have an active wireless connection (e.g., WLAN, Internet, etc.) to the management device and a wired connection (e.g., Ethernet) to the device 100. The LLDP message is used to advertise identity, capabilities, location, and neighboring devices of respective network devices.

Method 200 includes sending a second LLDP message to a neighboring device of the plurality of neighboring devices, where information contained in the second LLDP message is routed to the management device by the neighboring device, at 230. For example, based on the location/address information contained in the LLDP received from the neighboring device, controller module 102 can establish a communication link with the neighboring device and send an LLDP message to the neighboring device advertising its information. Information contained in the LLDP message from the device 100 can be routed to the management device 160 by the neighboring device. Further, information contained in the LLDP message from the device 100 indicates that connection to the management device 160 has failed.

Method 200 includes receiving configuration changes from the management device, where the configuration changes are routed via the neighboring device, at 240. For example, device 100 can receive configuration changes from the management device 160, where the configuration changes are routed via the neighboring device. Based on information contained in the LLDP message from device 100, the management device 160 is able to determine that connection with the device 100 has failed and also determine a location of the device 100.

Method 200 includes implementing the configuration changes at the device and establishing connection with the management device, at 250. For example, controller module 102 can implement the received configuration changes at the device 100 and establish a connection with the management device. In some examples, the method 200 of FIG. 2 includes additional steps in addition to and/or in lieu of those depicted in FIG. 2.

Figure 3:
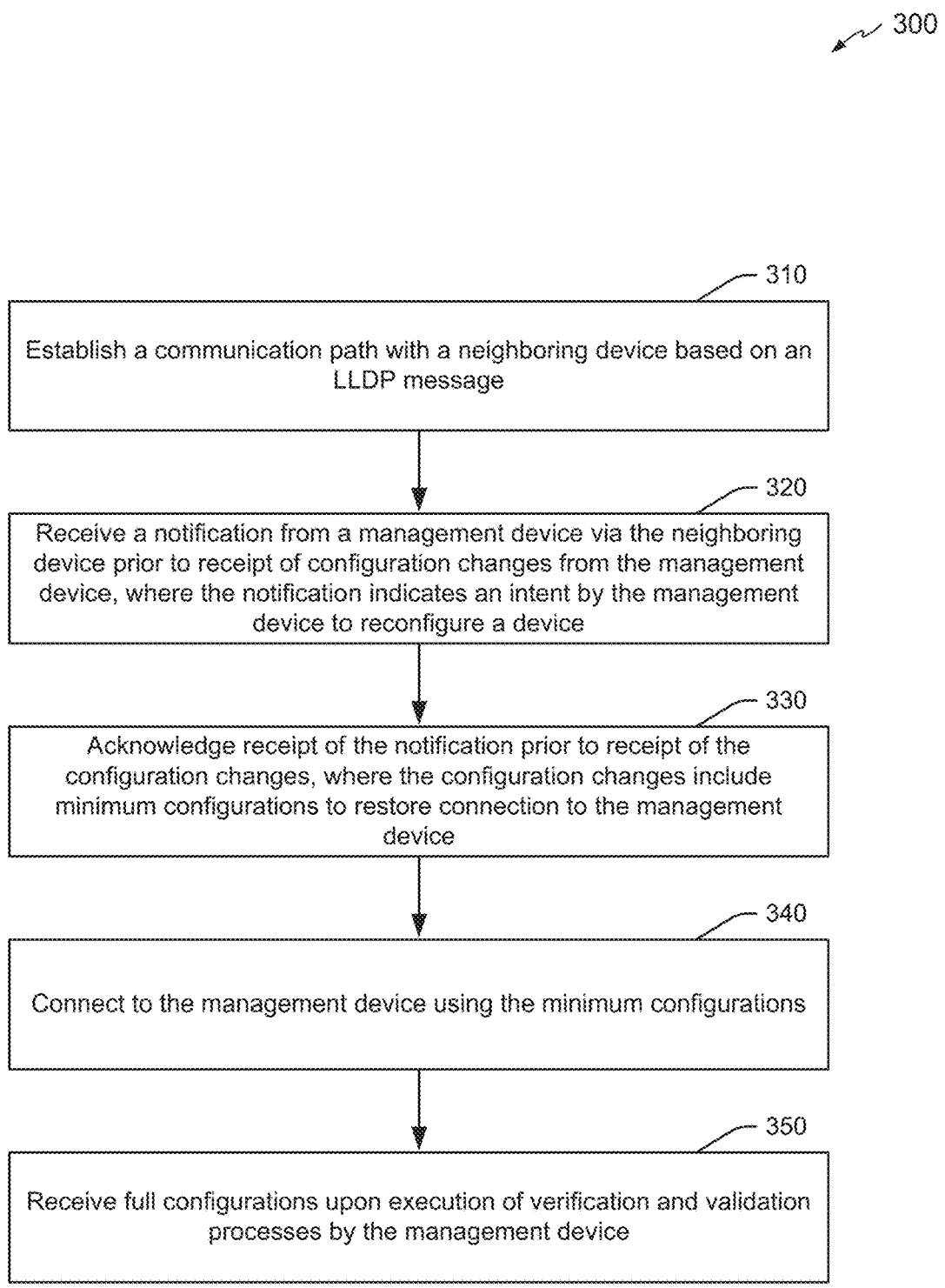
FIG. 3 is a flowchart of an example method for configuring network devices.

FIG. 3 is a flowchart of an example method for configuring network devices. Although execution of method 300 is described below with reference to device 100 of FIG. 1, other suitable devices for execution of method 300 may be used. Method 300 can be implemented in the form of executable instructions stored on a computer-readable storage medium, such as computer-readable storage medium 420 of FIG. 4, and/or in the form of electronic circuitry.

Method 300 includes establishing a communication path with a neighboring device based on an LLDP message, at 310. For example, device 100 can establish a communication path with a neighboring device based on an internet protocol (IP) address of the neighboring device included in the LLDP message received from the neighboring device. In some examples, device 100 can configure an interface (e.g., configure an unused IP address) to the IP address of the neighboring device to establish a communication link with the neighboring device.

Method 300 includes receiving a notification from a management device via the neighboring device prior to receiving configuration changes from the management device, where the notification indicates an intent by the management device to reconfigure the device, at 320. For example, the device 100 can receive a notification message from the management device 160 via the neighboring device, where the notification message indicates an intent by the management device 160 to reconfigure (i.e., send configuration changes) to the device 100.

Method 300 includes acknowledging receipt of the notification prior to receiving the configuration changes, where the configuration changes include minimum configurations to restore connection to the management device, at 330. For example, the device 100 can acknowledge (i.e., accept) receipt of the notification, prior to receiving the configuration changes from the management device 160, where the configuration changes include minimum configurations to establish a connection with the management device 160.

Method 300 includes connecting to the management device using the minimum configurations, at 340. For example, the device 100 can implement the minimum configurations to establish (or restore) connection to the management device 160.

Method 300 also includes receiving full configurations upon execution of verification and validation processes by the management device, at 350. For example, once connection is established with the management device 160 using the minimum configurations, device 100 can be required to pass verification and validation tests to authenticate device 100, prior to the full configuration data. In some examples, the method 300 of FIG. 3 includes additional steps in addition to and/or in lieu of those depicted in FIG. 3.

Figure 4:
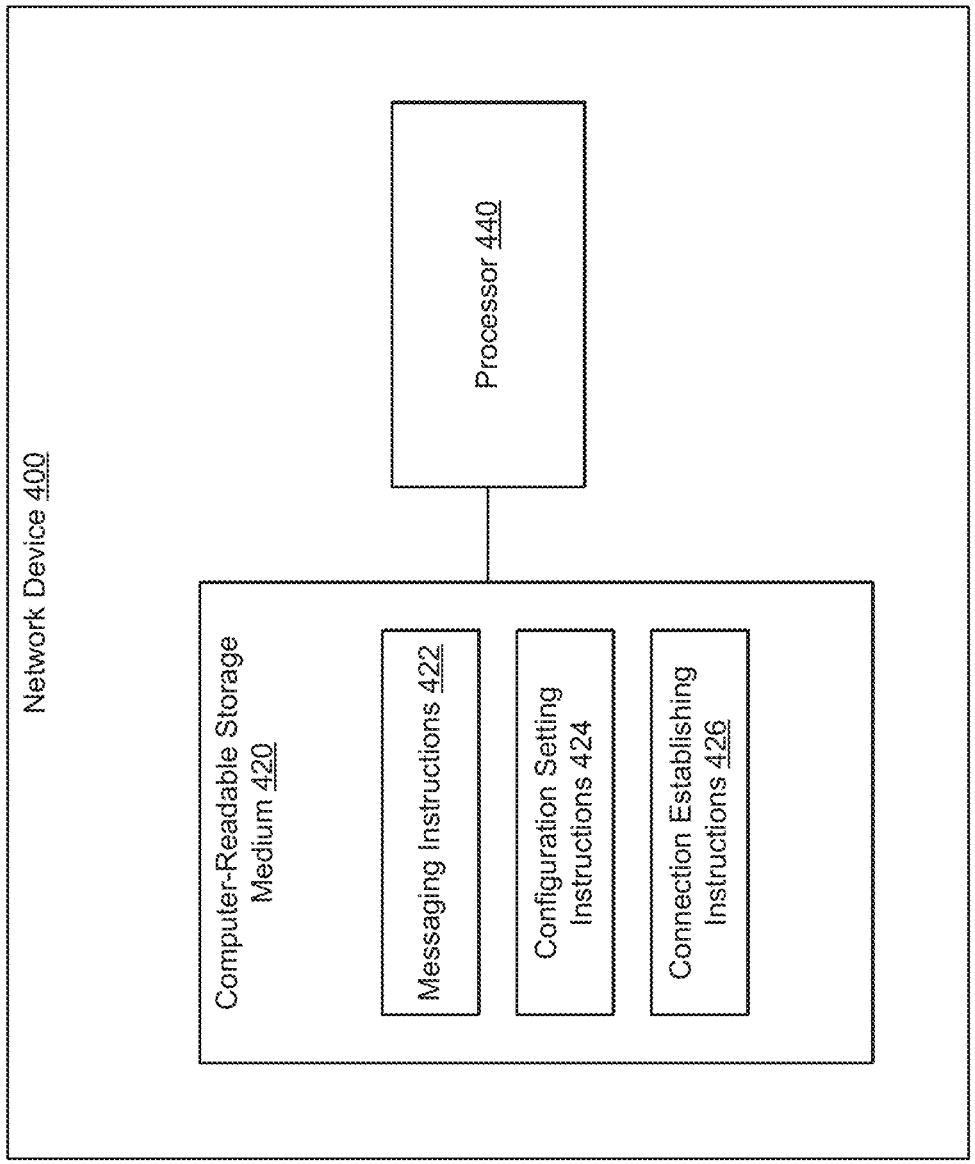
FIG. 4 is a block diagram of a computer-readable storage medium having instructions executable to configure a network device.

FIG. 4 is a block diagram of a computer-readable storage medium having instructions executable to configure a network device. Network device 400 can be similar to device 100 of FIG. 1. Device 400 includes a processor 440 and a computer-readable storage medium 420.

Processor 440 can be one or more central processing units (CPUs), microprocessors, and/or other hardware devices suitable for retrieval and execution of instructions stored in computer-readable storage medium 420. Processor 440 may fetch, decode, and execute instructions 422, 424, and 426 to enable configuring of device 400, as described below. As an alternative or in addition to retrieving and executing instructions, processor 440 may include one or more electronic circuits comprising a number of electronic components for performing the functionality of one or more of instructions 422, 424, and 426.

Computer-readable storage medium 420 may be any electronic, magnetic, optical, or other physical storage device that stores executable instructions. Thus, computer-readable storage medium 420 may be, for example, random access memory (RAM), content addressable memory (CAM), ternary content addressable memory (TCAM), an electrically-erasable programmable read-only memory (EEPROM), flash memory, a storage drive, an optical disc, and the like. As described in detail below, computer-readable storage medium 420 may be encoded with executable instructions for enabling the configuration of device 400.

Messaging instructions 422 include instructions to listen for and receive a link layer discovery protocol (LLDP) message from a second network device, in response to determining that connection with a management device is unsuccessful after a predetermined number of attempts, and send a second LLDP message to the second device, where data contained in the second LLDP message is routed to the management device by the second device and where the data indicates that the device is unable to connect to the management device. The instructions 422 are executable to identify an IP address of the second device based on the LLDP message received from the second device and establish a communication link with the second device. Further, the second LLDP can be broadcast to a plurality of devices, including the second device that are communicatively coupled to the device 400 and to the management device 160.

Configuration setting instructions 424 include instructions to receive a configuration packet from the management device via the second device. For example, the second device can route the information contained in the second LLDP message sent by the device 400 to the management device 160, where the information indicates that the device is unable to connect to the management device 160. Based on the information, the management device 160 can send a configuration packet to the device 400 via the second device.

Connection establishing instructions 426 include instructions to restore connection to the management device based on the configuration packet. For example, device 400 can receive and implement the configuration packet to restore connection to the management device.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

What is claimed is:

1. A first network device, comprising:
a controller processor to:
receive, at the first network device, a first link layer discovery protocol (LLDP) message from a second network device communicatively coupled to the first network device, wherein the first LLDP message is received in response to the first network device determining that connection of the first network device to a management device has failed, the second network device having an active connection to the management device;
extract, by the first network device, an address of the second network device;
configure the first network device, by the first network device, to communicate with the second network device;
send a second LLDP message to the second network device, wherein information contained in the second LLDP message is routed to the management device by the second network device, the information indicating that the network device is unable to connect to the management device;
receive configuration changes from the management device via the second network device to establish a connection between the network device and the management device; and
connect the first network device to the management device based on the configuration changes.

2. The first network device of claim 1, wherein the controller processor is to listen for the first LLDP message from the second network device after a predetermined number of unsuccessful attempts to connect to the management device.

3. The first network device of claim 2, wherein the controller processor is to identify an internet protocol (IP) address of the second network device based on the first LLDP message and to communicate with the second network device using the IP address.

4. The first network device of claim 1, wherein the controller processor is to broadcast the second LLDP message to a plurality of network devices communicatively coupled to the first network device and wherein the plurality of network devices are communicatively coupled to the management device.

5. The first network device of claim 1, wherein the controller processor is to implement the configuration changes at the first network device to restore connection to the management device.

6. The first network device of claim 1, wherein the first and second LLDP messages include information about the respective network devices comprising identity, capabilities, location, and neighboring network devices.

7. The network device of claim 1, wherein the configuration changes comprise minimum configuration changes to establish the connection to the management device.

8. The network device of claim 7, wherein the first network device receives data packets to execute security and verification processes to determine if the first network device is a valid network device prior to receiving full configuration data.

9. The network device of claim 1, wherein prior to receiving the configuration changes, the first network device receives a notification message from the management device via the second network device indicating an intent by the management device to reconfigure the first network device.

10. The first network device of claim 1, wherein the address is extracted from a management type length value (TLV) of the LLDP message from the second network device.

11. A method, comprising:
determining, by a first network device, that connection to a management device has failed after a predetermined number of unsuccessful attempts;
listening for a first link layer discovery protocol (LLDP) message from a plurality of neighboring network devices communicatively coupled to the first network device and to the management device, the plurality of neighboring network devices having active connections to the management device;

sending a second LLDP message to a second network device of the plurality of neighboring network devices, wherein information contained in the second LLDP message is routed to the management device by the second network device, the information indicating that the first network device is unable to connect to the management device via a first communication network, the second network device having an active connection to the management device using the first communication network, and wherein the first network device and the second network device are connected via a second communication network;

receiving configuration changes from the management device, wherein the configuration changes are routed via the second network device using the first communication network, and the configuration changes used to establish a connection between the management device and the first device using the first communication network; and implementing the configuration changes at the first network device and establishing connection between the first network device and the management device using the first communication network.

12. The method of claim 11, comprising establishing a communication path with the second network device based on the second LLDP message.

13. The method of claim 11, comprising:
receiving a notification from the management device via the second network device prior to receiving the configuration changes, wherein the notification indicates an intent by the management device to reconfigure the first network device; and
acknowledging receipt of the notification prior to receiving the configuration changes.

14. The method of claim 11, wherein the configuration changes include minimum configurations to restore connection to the management device, wherein the method comprises:
connecting to the management device using the minimum configurations; and
receiving full configurations upon execution of verification and validation processes by the management device.

15. The method of claim 11, further comprising, prior to receiving the configuration changes, at the first network device, receiving a notification message from the management device via the second network device indicating an intent by the management device to reconfigure the first network device.

16. The method of claim 11, wherein the first communication network is an active wireless connection and the second communication network is a wired connection.

17. A non-transitory computer-readable storage medium encoded with instructions executable by a processor of a first network device, the computer-readable storage medium comprising instructions to:
listen for and receive a first link layer discovery protocol (LLDP) message from a second network device communicatively coupled to the first network device, in response to determining that connection between the first network device and a management device is unsuccessful after a predetermined number of attempts, the second network device being actively connected to the management device;
extract an address of the second network device;
configure the first network device to communicate with the second network device;
send a second LLDP message to the second network device, wherein data contained in the second LLDP message is routed to the management device by the second network device, and wherein the data indicates that the first network device is unable to connect to the management device;
receive a configuration packet from the management device via the second network device; and
restore connection between the first network device and the management device based on the configuration packet.

18. The non-transitory computer-readable storage medium of claim 17, comprising instructions to identify an internet protocol (IP) address of the second network device based on the LLDP message and to communicate with the second network device using the IP address.

19. The non-transitory computer-readable storage medium of claim 17, wherein the second LLDP message is broadcast to a plurality of network devices including the second network device, wherein the plurality of network devices are communicatively coupled to the management device and to the first network device.

20. The non-transitory computer-readable storage medium of claim 17, wherein the configuration packet comprises minimum configuration changes to restore the connection to the management device.

* * * * *